(12) United States Patent
Caldejon et al.

(10) Patent No.: US 9,426,071 B1
(45) Date of Patent: Aug. 23, 2016

(54) STORING NETWORK BIDIRECTIONAL FLOW DATA AND METADATA WITH EFFICIENT PROCESSING TECHNIQUE

(71) Applicant: FireEye, Inc., Milpitas, CA (US)

(72) Inventors: Randy I. Caldejon, Crozet, VA (US); Dennis Lee Edwards, Crozet, VA (US); Christopher Hayes Fauerbach, Midlothian, VA (US)

(73) Assignee: FireEye, Inc., Milpitas, CA (US)

( * ) Notice: Subject to any disclaimer, the term of this patent is extended or adjusted under 35 U.S.C. 154(b) by 80 days.

(21) Appl. No.: 14/463,226

(22) Filed: Aug. 19, 2014

Related U.S. Application Data

(60) Provisional application No. 61/868,767, filed on Aug. 22, 2013.

(51) Int. Cl.
   *H04L 12/743* (2013.01)
   *G06F 17/30* (2006.01)

(52) U.S. Cl.
   CPC ...... *H04L 45/7453* (2013.01); *G06F 17/30424* (2013.01)

(58) Field of Classification Search
   CPC ............... H04L 45/7453; G06F 17/30424
   See application file for complete search history.

(56) References Cited

U.S. PATENT DOCUMENTS

| | | | |
|---|---|---|---|
| 9,038,151 B1 * | 5/2015 | Chua ................. | H04L 45/42 709/223 |
| 2012/0209862 A1 * | 8/2012 | Hernandez ............. | H04L 69/22 707/755 |
| 2014/0157405 A1 * | 6/2014 | Joll ..................... | H04L 63/1425 726/22 |

OTHER PUBLICATIONS

Berkeley Packet Filter (BPF) Syntax, taken from the man page of pcdump, Jul. 19, 2014, 11 pages.
Carstens et al., Programing with PCAP, http://www.tcpdump.org/pcap.html, 2002, 8 pages.
D'Antonio et al., Flow Selection Techniques, Internet Engineering Task Force (IETF), Request for Comments: 7014, Sep. 2013, 33 pages.
McCanne et al., The BSD Packet Filter: A New Architecture for User-level Packet Capture, Dec. 19, 1992, 11 pages.
Paxson et al., An Architecture for Exploiting Multi-Core Processors to Parallelize Network Intrusion Prevention, International Computer Science Institute, IEEE Sarnoff Symposium at Princeton NJ, Apr. 2007, 7 pages.

(Continued)

*Primary Examiner* — Jianye Wu
(74) *Attorney, Agent, or Firm* — Cesari and McKenna, LLP

(57) ABSTRACT

A processing technique provides an improved indexing arrangement that enables storage, filtering and querying of metadata used to retrieve packets captured from a network and persistently stored in a data repository. A packet capture engine records the packets in packet capture (PCAP) formats from a network link at a substantially high packet transfer rate to persistent storage of the data repository in a sustained manner. Efficient filtering and querying of the metadata to retrieve the stored packets may be achieved, in part, by organizing the metadata as one or more metadata repositories. The processing technique uses the Berkeley Packet Filter (BPF) language as an interface of a BPF engine to search or index the stored packets in response to queries. The BPF engine processes BPF expressions used as precursors to the indexing arrangement to enable access to the repositories when searching and locating stored packets matching the expressions.

20 Claims, 5 Drawing Sheets

(56) References Cited

OTHER PUBLICATIONS

Quittek et al., Information Model for IP Flow Information Export, Request for Comments: 5102, Jan. 2008, 171 pages.

Trammell et al., Bidirectional Flow Export Using IP Flow Information Export, Request for Comments: 5103, Jan. 2008, 24 pages.

Wikipedia, NetFlow, last modified Jun. 27, 2014, http://en.wkipedia.org/wiki/Netflow, Jun. 27, 2014, 11 pages.

* cited by examiner

| ITEM | NAME 610 | SIZE 620 (BYTES) | EXPRESSION 630 (f : FLOW META DATA OFFSET) |
|---|---|---|---|
| 1 | flowReason | 1 | ether[f+0:1] |
| 2 | layer3Offset | 1 | ether[f+1:1] |
| 3 | layer3Flagsin | 1 | ether[f+2: 1] |
| 4 | Layer3FlagsOut | 1 | ether[f+3: 1] |
| 5 | layer4Offset | 1 | ether[f+4: 1] |
| 6 | layer4Flagsin | 1 | ether[f+5:1] |
| 7 | layer4FlagsOut | 1 | ether[f+6:1] |
| 8 | streamNumber | 1 | ether[f+7:1] |
| 9 | sortedHashValue | 4 | ether[f+8:4] |
| 10 | roundTripTime | 4 | ether[f+12:4] |
| 11 | flowEndSeconds | 4 | ether[f+16:4] |
| 12 | flowEndNanoseconds | 4 | ether[f+20:4] |
| 13 | octetDeltaCou ntIn | 8 | ether[f+24:4] ether[f+28:4] |
| 14 | octetDeltaCountOut | 8 | ether[f+32:4] ether[f+36:4] |
| 15 | packetDeltaCountIn | 8 | ether[f+40:4] ether[f+44:4] |
| 16 | packetDeltaCountOut | 8 | ether[f+48:4] ether[f+52:4] |
| 17 | droppedOctetDeltaCountIn | 8 | ether[f+56:4] ether[f+60:4] |
| 18 | droppedOctetDeltaCountOut | 8 | ether[f+64:4] ether[f+68:4] |
| 19 | droppedPacketDeltaCountIn | 8 | ether[f+72:4] ether[f+76:4] |
| 20 | droppedPacketDeltaCountOut | 8 | ether[f+80:4] ether[f+84:4] |

FIG. 6

STORING NETWORK BIDIRECTIONAL FLOW DATA AND METADATA WITH EFFICIENT PROCESSING TECHNIQUE

RELATED APPLICATION

The present application claims priority from Provisional Patent Application No. 61/868,767, entitled System, Device and Method for Storing Network Flow Data and Metadata with an Efficient Processing Mechanism, filed on Aug. 22, 2013, the contents of which are incorporated herein by reference.

BACKGROUND

1. Technical Field

The present disclosure relates to the storage and retrieval of computer network packet traffic using summary information commonly referred to as network flow information. In this disclosure, bidirectional flow, i.e. commonly referred to as connection information, is represented in a single flow record similar to RFC 5103.

2. Background Information

A network flow is a collection, e.g., sequence, of packets transmitted over a computer network from a port on a source computer to a port on a destination computer utilizing a protocol. Conceptually, network flow information is a summary of a communication between two computer endpoints. Many manufacturers include network monitoring and flow information export capabilities in their network switches and routers, resulting in many accepted representation formats. Common to all formats are data fields identifying the endpoints of the communication and summary information for the packets included in the flow.

Exported network flow records may be collected and stored by a network flow collector program. Techniques for record storage are dependent on the requirements of the collector and the anticipated use of the data. Each collector is associated with a search and retrieval mechanism designed to take advantage of its storage facilities.

The Berkeley Packet Filter (BPF) mechanism was developed at Lawrence Berkeley Laboratory and is a known filtering mechanism used for processing packets. The mechanism includes a language and virtual machine used for creating simple programs that filter packets. The instruction set includes primitives for fetching, comparing, and performing arithmetic operations on data from the packet. A packet is filtered, i.e., accepted or rejected, based on the results of the program.

One of the first implementations to incorporate BPF is tcpdump, a tool widely used for monitoring computer communication networks. Like BPF, tcpdump was developed at Lawrence Berkeley Laboratory. The command-line program implements a low-level application programming interface (API) for sniffing packets from a network interface and for performing file I/O operations.

The software source code for the packet capture interface and BPF is available as a standalone library, commonly referred to as libpcap. The library is available to the public under the Berkeley System Distribution (BSD) license. Because of its portability, flexibility, and simple implementation, libpcap is considered the de facto mechanism for packet capture and filtering.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which:

FIG. 6 is a tabular representation of exemplary flow metadata included in the PCAP record.

OVERVIEW

Figure 1:
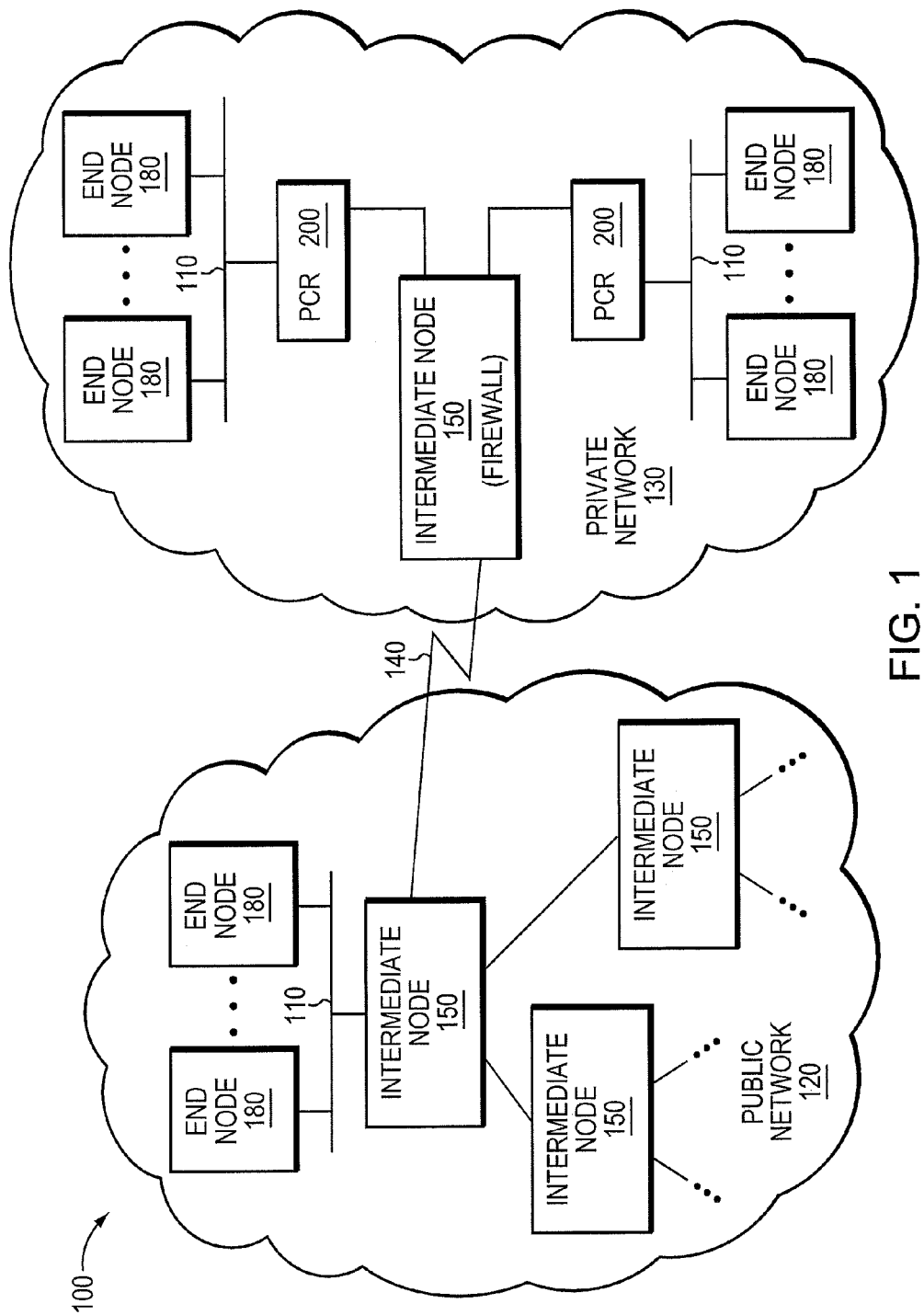
FIG. 1 is a block diagram of a network environment that may be advantageously used with one or more embodiments described herein.

Embodiments herein are directed to a processing technique configured to provide an improved indexing arrangement that enables efficient storage, filtering and querying of metadata used to retrieve packets intercepted (captured) from a network and persistently stored in a data repository. A packet capture engine includes an interface configured to record the packets in packet capture (PCAP) formats from a network link at a substantially high packet transfer rate and write those packets to persistent storage of the data repository in a sustained manner. Efficient filtering and querying of the metadata to retrieve the stored packets may be achieved, in part, by organizing the metadata as one or more metadata repositories, each having a size that is smaller than the size of the data repository storing the packets. The processing technique uses the Berkeley Packet Filter (BPF) language as an interface of a BPF engine to search or index the stored packets in response to queries. To that end, the BPF engine processes BPF expressions used as precursors to the indexing arrangement to enable access to the repositories when searching and locating stored packets matching the expressions.

Illustratively, the processing technique extends the capabilities of BPF and PCAP by (i) encapsulating network flow metadata within PCAP metadata records that are derived from the packets captured and stored in the data repository, and (ii) using the BPF engine for filtering operations on the PCAP metadata records. In an embodiment, the packet capture engine includes a decoder that decodes (e.g., extracts) network flow information ("network flow") of each captured packet and applies a hash function to the network flow to calculate a hash value. The hash value, along with a reference locating the associated captured packet stored in the data repository, are stored in a metadata repository of the indexing arrangement. A flow metadata payload is appended to the PCAP metadata record, wherein the payload includes BPF flow metadata embodied as fields and pointers to fields of the network flow of the captured packet (as encapsulated in the PCAP record). The PCAP record and the hash value associated with the network flow of the PCAP record are stored in a different metadata repository of the indexing arrangement. In response to one or more BPF queries, the BPF engine may filter the PCAP records using the BPF flow metadata and utilize the hash values in connection with the indexing arrangement to search and retrieve packets that match the queries.

Advantageously, the processing technique described herein provides, among other things, a storage format and an improvement to a known filtering mechanism which extends a common query language for network flow and network packets. That is, the technique defines a storage format for network flow records and improves upon the BPF mechanism for processing recorded records. In addition, the extended BPF and PCAP capabilities provide for improved filtering of packets on a computer communications network, and further provide for querying large data sets of archived packets and metadata associated with computer communications. Moreover, the indexing arrangement of the technique enables persistent storage of captured packet traffic at substantially high transfer rates, e.g., approximately 10 Gb/sec full duplex sustained, while enabling concurrent filtering and retrieval of previously stored packet traffic "on-the-fly" to reduce search and retrieval time.

DESCRIPTION

FIG. 1 is a block diagram of a network environment 100 that may be advantageously used with one or more embodiments described herein. The network environment 100 illustratively includes a plurality of computer communications networks organized as a public network 120, such as the Internet, and a private network 130 (i.e., customer network), such as an organization, enterprise, or personal network. The networks 120, 130 illustratively include a plurality of network links and segments connected to a plurality of nodes. The network links and segments may include local area networks (LANs) 110 and wide area networks (WANs) 140, including wireless networks, interconnected by intermediate nodes 150 to form an internetwork of nodes, wherein the intermediate nodes 150 may include network switches, routers and/or one or more packet capture and retrieval systems (PCRs 200) described further herein. The LANs 110 may, in turn, interconnect end nodes 180 which, in the case of private network 130, may be illustratively embodied as endpoints.

In an embodiment, the endpoints may illustratively include, e.g., client/server desktop computers, laptop/notebook computers, process controllers, medical devices, data acquisition devices, mobile devices, such as smartphones and tablet computers, and/or any other intelligent electronic device having network connectivity that may be configured to implement a virtualization system. The nodes illustratively communicate by exchanging packets or messages (i.e., network traffic) according to a predefined set of protocols, such as the Transmission Control Protocol/Internet Protocol (TCP/IP); however, it should be noted that other protocols, such as the HyperText Transfer Protocol (HTTP), may be advantageously used with the embodiments herein. In the case of private network 130, the intermediate node 150 may include a firewall or other network device configured to limit or block certain network traffic to protect the endpoints from unauthorized users.

Figure 2:
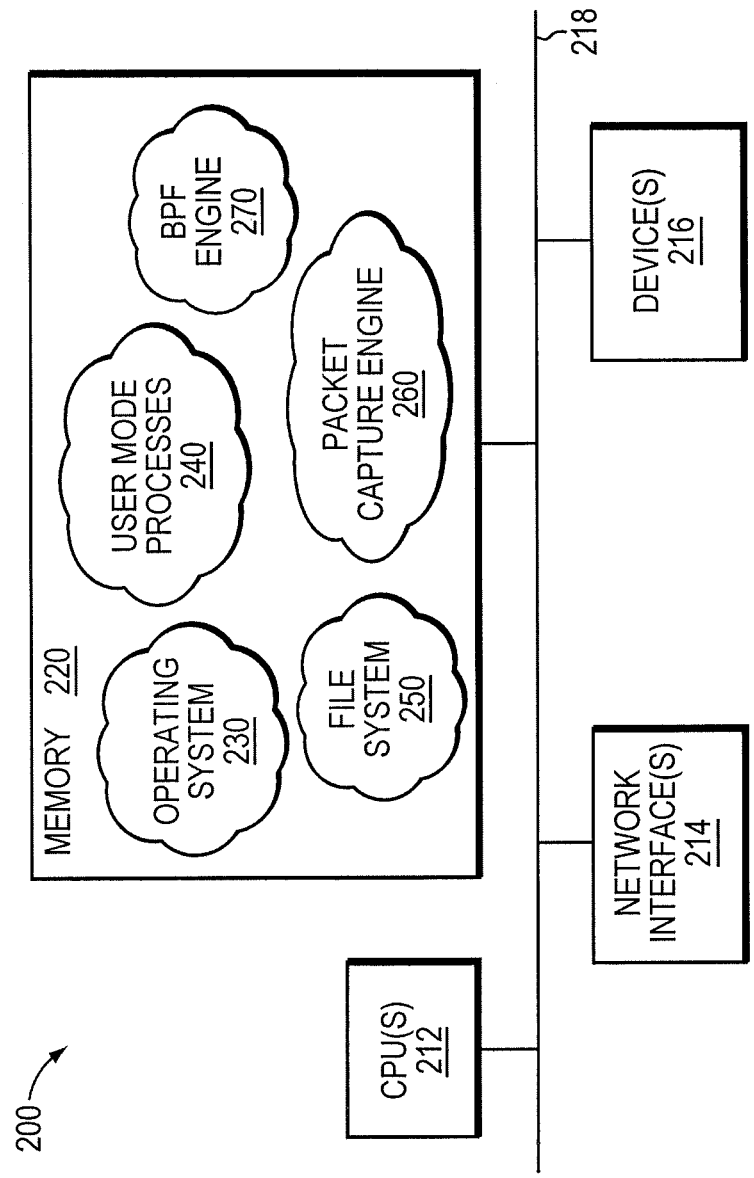
FIG. 2 is a block diagram of an intermediate node that may be advantageously used with one or more embodiments described herein.

FIG. 2 is a block diagram of an intermediate node that may be advantageously used with one or more embodiments described herein. The intermediate node is illustratively embodied as PCR 200 and includes one or more central processing units (CPUs) 212, a memory 220, one or more network interfaces 214 and one or more devices 216 connected by a system interconnect 218, such as a bus. The devices 216 may include various input/output (I/O) or peripheral devices, such as storage devices (e.g., disks) organized as storage (e.g., data and metadata) repositories of volumes and files embodied as secondary storage. The disks may be solid state drives (SSDs) embodied as flash storage devices or other non-volatile, solid-state electronic devices (e.g., drives based on storage class memory components), although, in an embodiment, the disks may be hard disk drives (HDDs). Each network interface 214 may contain the mechanical, electrical and signaling circuitry needed to connect the node to the network 130 to thereby facilitate communication over the network. To that end, the network interface 214 may be configured to transmit and/or receive messages using a variety of communication protocols including, inter alia, TCP/IP and HTTP. The memory 220 may include a plurality of locations that are addressable by the CPU(s) 212 and the network interface(s) 214 for storing software program code (including application programs) and data structures associated with the embodiments described herein. The CPU 212 may include processing elements or logic adapted to execute the software program code and application programs, such as packet capture engine 260 and BPF engine 270, and manipulate the data structures. Exemplary CPUs may include families of instruction set architectures based on the x86 CPU from Intel Corporation of Santa Clara, Calif. and the x64 CPU from Advanced Micro Devices of Sunnyvale, Calif.

An operating system 230, portions of which are typically resident in memory 220 and executed by the CPU, functionally organizes the node by, inter alia, invoking operations in support of the software program code and application programs executing on the node. A suitable operating system 230 may include the Linux operating system, although the Unix operating system and Windows series of operating systems, among others, may also be used. The operating system 230 illustratively implements a high-level module, such as a file system 250, to logically organize the information as a hierarchical structure of named storage containers, such as directories, files and/or volumes that hold the files. A suitable file system 250 may include the XFS file system, although other file systems capable of high I/O operations per second (IOPs) and throughput, such as EXT4, may be used. Illustratively, the software program code may be implemented as user mode processes 240 of the operating system 230. As used herein, a process (e.g., a user mode process) is an instance of software program code (e.g., an application program) executing in the operating system that may be separated (decomposed) into a plurality of threads, wherein each thread is a sequence of execution within the process.

It will be apparent to those skilled in the art that other types of processing elements and memory, including various computer-readable media, may be used to store and execute program instructions pertaining to the embodiments described herein. Also, while the embodiments herein are described in terms of software program code and application programs stored in memory, alternative embodiments also include the code/programs being embodied as modules consisting of hardware, software, firmware, or combinations thereof.

Embodiments herein are directed to a processing technique configured to provide an improved indexing arrangement that enables efficient storage, filtering and querying of metadata used to retrieve packets intercepted (captured) from a network and persistently stored in a data repository. The packet capture engine 260 includes an interface configured to record the packets in packet capture (PCAP) formats from a network link (e.g., of network 130) at a substantially high packet transfer rate, e.g., approximately full-duplex, 10 Gigabits (Gb) per second, and write those packets through memory 220 to persistent storage of the data repository (e.g., secondary storage) in a sustained manner. In other words, the packet capture engine is configured to capture the packets at any packet transmission rate provided by the network link for a duration that yields an amount of captured packets that exceeds the memory capacity of the node such that the packets are written through to the persistent secondary storage without dropping the packets (i.e., without packet loss due to write through not keeping up with the packet transmission rate) and while maintaining capture of the packets up to line-rate. Once persistently stored, the packets may be retrieved using the PCAP interface. Efficient filtering and querying of the metadata to retrieve the stored packets may be achieved, in part, by organizing the metadata as one or more metadata repositories (e.g., files), each having a size ("metadata footprint") that is smaller than the size of the data repository storing the packets. The processing technique uses the Berkeley Packet Filter (BPF) language as an interface of BPF engine 270 to search or index the stored packets in response to queries (i.e., BPF queries). To that end, the BPF engine 270 processes BPF expressions used as precursors (i.e., inputs) to the indexing arrangement to enable access to the repositories when searching and locating stored packets matching the expressions.

Illustratively, the processing technique extends the capabilities of BPF and PCAP by (i) encapsulating network flow metadata within PCAP metadata records that are derived from the packets captured and stored on the data repository, and (ii) using the BPF engine 270 for filtering operations on the PCAP metadata records. In an embodiment, the packet capture engine 260 includes a decoder that decodes (e.g., extracts) network flow information ("network flow") of each captured packet (e.g., IP, TCP and protocol fields) and applies a hash function to the network flow to calculate a hash value. The hash value, along with a reference locating the associated captured packet stored in the data repository, are stored in a first metadata repository (indexing metadata repository) of the indexing arrangement. A flow metadata payload is appended to the PCAP record, wherein the metadata payload includes BPF flow metadata embodied as fields and as pointers to fields of the network flow of the captured packet (as encapsulated in the PCAP record). The PCAP record and the hash value associated with the network flow of the PCAP record are stored in a second metadata repository (flow metadata repository) of the indexing arrangement. In response to one or more BPF queries, the BPF engine 270 may filter the PCAP records using the BPF flow metadata and utilize the hash values in connection with the indexing arrangement to search and retrieve packets that match the queries.

Figure 3:
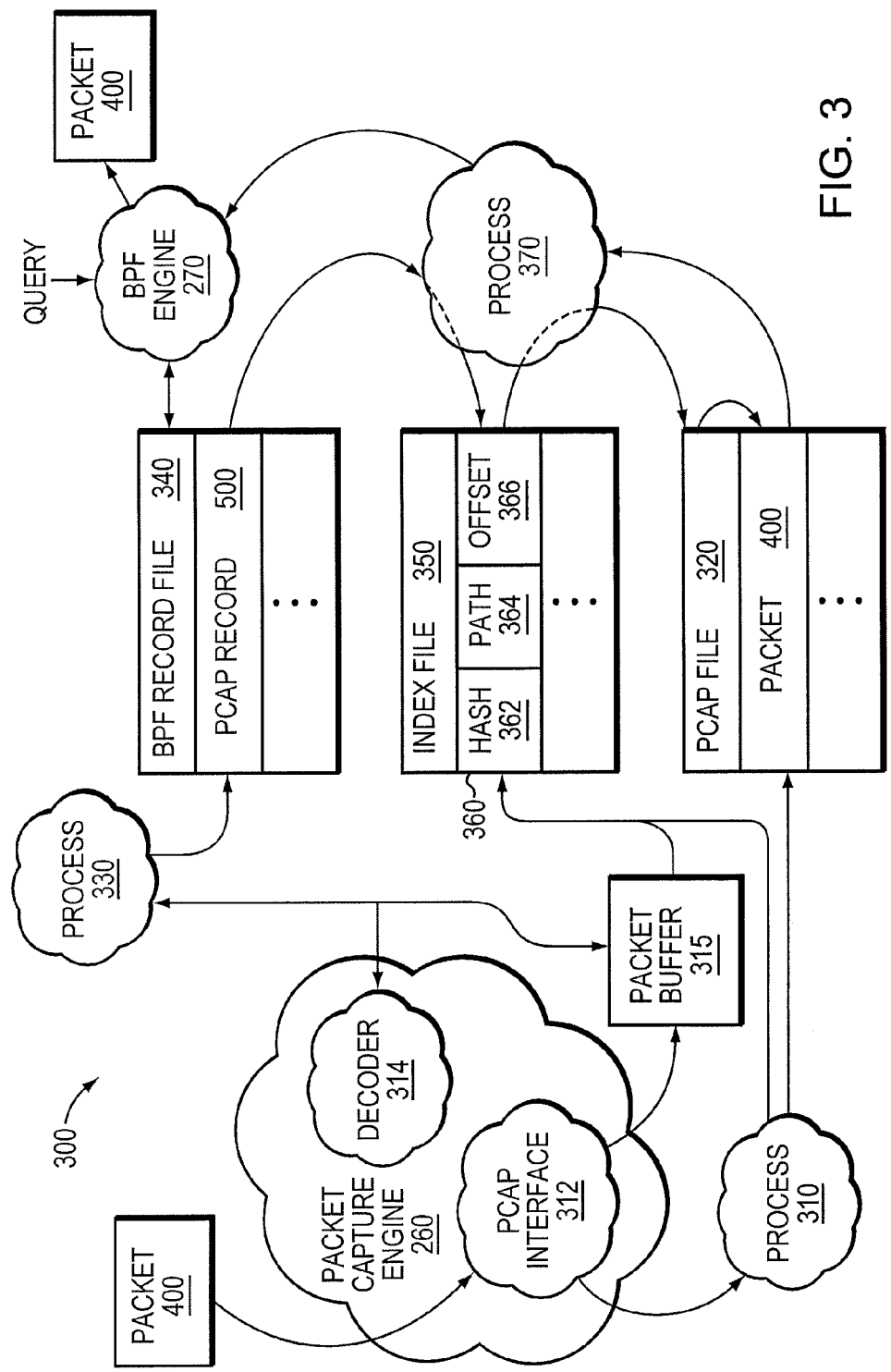
FIG. 3 illustrates an exemplary processing technique configured to provide an improved indexing arrangement.

FIG. 3 illustrates an exemplary processing technique configured to provide an improved indexing arrangement according to one or more embodiments described herein. In an embodiment, the technique 300 includes a packet capture and storage stage having packet capture engine 260 configured to generate indexes based on network flows of captured packets. Packets 400 are captured by a PCAP interface 312 (e.g., libpcap or other appropriate interfaces) of the packet capture engine 260 and organized as a packet buffer 315 of a predetermined size, e.g., one (1) MB, for processing by a decoder 314, which decodes (and hashes) the network flow of each packet. According to the processing technique, a hash function is applied to predefined protocol fields (such as fields of the Ethernet headers including TCP/IP) to calculate a hash value that enables fast and efficient indexing and look up (search) of packets associated with the network flow. In an embodiment, the hash function is a CRC-32C function, although other hashing functions may be used. The hash function may be applied to portions of the PCAP record sufficient to identify a captured packet with a low incidence of hash collision. Illustratively, the hash function may be applied to the network flow of a packet, wherein the network flow is defined as source and destination IP (layer 3) addresses, source and destination port (layer 4) numbers, and protocol address family (AF) type of the packet. However, hashing may be alternatively performed on other search parameters, such as one or more IP addresses (e.g., without ports) or Ethernet addresses if the IP protocol is not present. A process 310 may then cooperate with the packet capture engine 260 to write (copy) the packets 400 to the data repository, e.g., a PCAP file 320 on a first volume of the disks.

Figure 4:
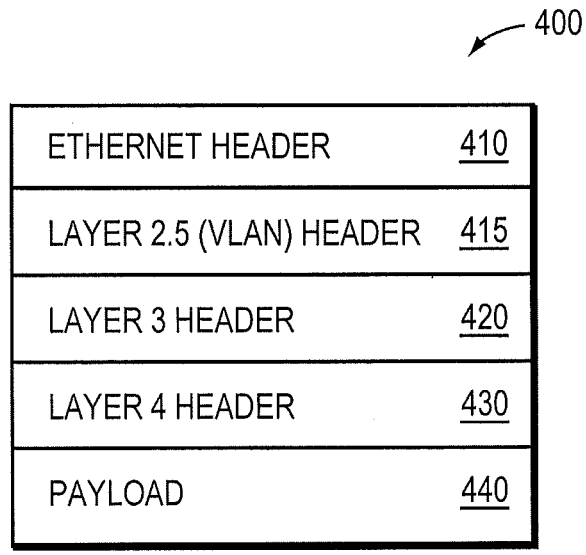
FIG. 4 is a block diagram illustrating a format of a generic network packet, such as a conventional Ethernet packet.

FIG. 4 is a block diagram illustrating a format of a generic network packet, such as a conventional Ethernet packet 400, having a plurality of headers, each of which includes a plurality of fields. The headers include an Ethernet header 410, a layer 2.5 virtual LAN (VLAN) header 415 (which may or may not be present in the packet 400) and a layer 3 header 420 that commonly contains Internet Protocol (IP) data. Note that the size of the IP header 420 differs between versions 4 and 6 of the IP protocol. Another header includes a layer 4 header 430 whose size is illustratively determined, in part, by the layer 4 protocol, e.g., TCP, that is used. The remaining field of the packet 400 is a payload 440 containing data being transmitted. The size of the packet payload 440 may range from empty to a limit computed from a maximum transmission unit (MTU) for the network segment over which the packet travels.

The packet buffer 315 is then passed to a process 330, which processes each packet's headers to form a bi-directional flow record, i.e., a PCAP metadata record (PCAP record 500), which is then copied to the flow metadata repository, e.g., a BPF record file 340, on a second volume of the disks. According to the processing technique, two different volumes are illustratively used to store the PCAP flow records 500 and the captured packets 400 so as to enable concurrent searching (queries) and retrieval of the PCAP records 500, while copying (writing) packets 400. That is, the PCAP file 320 may be written to the first volume (data repository), while the BPF record file 340 may be written to the second volume (flow metadata repository). Such concurrent (parallel) processing enables searching and retrieving of the indexes, including the hash values (within a small file) and copying of the packets (to a large file) at substantially the same time (e.g., substantial overlap of processing) to realize the approximate 10 Gb/sec full duplex rate (i.e., 20 Gb per second) of the network link. Note that every bi-directional flow metadata record is a fixed length so that search and retrieval operations may be controlled (i.e., efficient striding).

Figure 5:
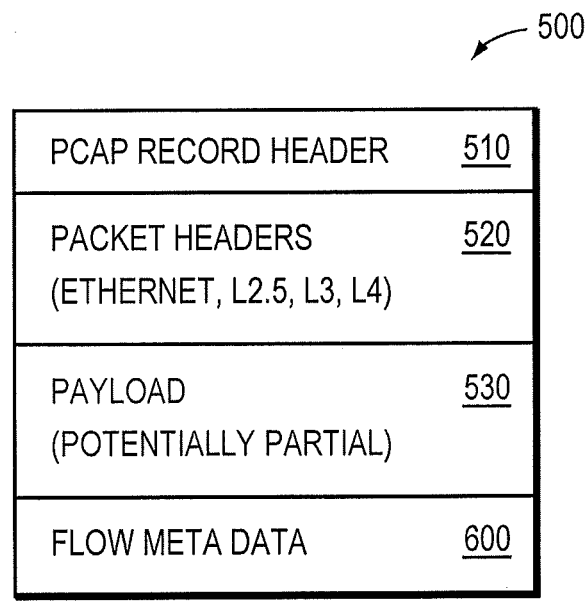
FIG. 5 is a block diagram illustrating a structure of a network flow record encapsulated in a fixed-length packet capture (PCAP) record.

FIG. 5 is a block diagram illustrating a structure of a network flow record encapsulated in a fixed-length PCAP record 500 in accordance with one or more embodiments described herein. The PCAP record 500 includes a PCAP record header 510 having fields for storing time, wire length, and capture length values (detailed in PCAP manpage available at www.tcpdump.org/pcap.html). According to the processing technique 300, the definition of the time value is altered to be an arrival time of a first packet in a flow represented within the record. In an embodiment, the length values are also defined to be the length of the flow record, not including the PCAP record header field. The record 400 also includes a field 520 containing the packet headers 410-430 of FIG. 4. The size of the field 520 may change with every flow. A field 530 represents a prefix of the packet payload described in connection with payload 440 of FIG. 4. Depending on the protocols used in the packet transmission and the size of the packet payload 440, the field 530 may be a partial or total recording of the first packet in the flow. In an embodiment, the field 530 may be configured to contain padding to allow flow metadata to start at a fixed offset from the beginning of the PCAP record 500.

Lastly, field 600 contains the flow metadata that describes additional details about the flow represented by the record 500. An aspect of the processing technique involves a definition of a PCAP file type for metadata that is compatible with the PCAP file format (detailed in PCAP manpage available at www.tcpdump.org/pcap.html) and the BPF query interface. Metadata fields are accessible using the BPF language (expressions) and predefined BPF macros may be employed to simplify common operations on the flow metadata. Encapsulation of the flow metadata facilitates implementation of mechanisms that accelerate operations on large data sets of packets, such as the indexing arrangement described further herein.

In an embodiment, the process 310 may also create indexes (based on the hashes of the network flows) and may obtain (i.e., cross-reference) locations (including offsets) of the packets 400 in the PCAP file 320 on the first volume (i.e., data repository), as well as paths to the PCAP file 320. That is, the indexes may include a path to the PCAP file 320 and an offset within the file to locate the packet 400. Illustratively, the process 310 may index each packet 400 by tagging it with the calculated hash, a path and an offset. The process 310 may copy (load) the information, i.e., hash value 362 along with path 364 and offset 366, as an entry 360 into a different metadata repository (index metadata repository), e.g., an index file 350, which contains other entries of indexes that point to (reference) captured packets 400, including original payloads, stored in the PCAP file 320, as well as other metadata attributes such as packet direction. In an embodiment, there may be a plurality of PCAP files 320, wherein each file 320 has an associated index file 350. Each PCAP file 320 may be identified by a path 364 formed from a stream and a time stamp relating to the time of capture (e.g., in nanoseconds) of a packet 400. Illustratively, a naming convention for each PCAP (packet) file 320 may be based on the time stamp (e.g., a time group) and the stream, which is illustratively a "channel" used to write packets 400 to the PCAP packet file 320. For example, the processing technique 300 may include four streams, wherein each stream is represented by a directory (e.g., streams 0-3) and wherein each stream is mapped to a CPU 212 (e.g., a processor core) to enable concurrent processing, i.e., parallel writing and retrieval from the first volume (i.e., data repository). The stream and time stamp thus cooperate to provide a full path name to the PCAP file 320 containing the desired packet 400.

The processing technique 300 also includes a query and retrieval stage having BPF engine 270 configured to use the generated indexes to access one or more stored packets 400. Assume a user requests retrieval of all IP traffic originated from a particular IP source address connecting to particular port, e.g., port 80 for HTTP traffic. For example, the user may issue a BPF query having the following BPF expression: "host 10.0.0.1 and port 80". The user may submit the query to the BPF engine 270, which compiles the BPF expression to examine the PCAP records 500 of the BPF record file 340, including the flow metadata. FIG. 6 is a tabular representation of exemplary flow metadata 600 included in the PCAP record 500. Illustratively, the flow metadata 600 may include names 610 and sizes 620 of fields that may be included in field 600 of FIG. 5. Exemplary flow metadata may be found in RFC 5102, *IP Flow Information Export (IPFIX) Entities*, available from the Internet Engineering Task Force (IETF). As noted, the flow metadata is located at a defined location within the PCAP record 500 and each field of the record 500 is of a defined size; accordingly, the location of each field within the PCAP record is known. Therefore, the location and size of each flow metadata field may be expressed relative to the beginning of the Ethernet header.

According to the processing technique, BPF syntax (detailed in PCAP-filter manpage available at www.tcpdump.org/manpages/pcap-filter.7.html) may be extended to include abbreviations for each flow metadata field stored in the PCAP record 500. That is, the BPF syntax may be extended to include the flow metadata fields as keywords. Illustratively, the names 610 are abbreviations that may be used in the extended BPF syntax. Each abbreviation, name, is equivalent to the BPF proto-offset ether[offset(name):size (name)] where offset(name) is the offset of field name relative to the beginning of the Ethernet header and size(name) is the number of bytes of data stored for field name, as illustrated at 620. The technique also extends the BPF capabilities to perform relational operations on flow metadata types larger than four bytes (e.g., see items 13-20 in FIG. 6). Expressions of the form name relop expr may be translated into equivalent statements utilizing BPF binary operators &, <<, and >>, as well as concatenation and alternation conjunctions, and parentheses.

In order to remain backwards compatible with existing BPF syntax and key words, a mapping between the extended BPF syntax and the BPF compiler may be performed. Such mapping illustratively involves replacement of the (custom) flow metadata keywords in an extended BPF expression or statement with a standard BPF compatible statement. For example, to match all network traffic on port 80 that also had a calculated round trip time of greater than 300 seconds, an "enhanced BPF" query of:

"port 80 and roundTripTime>300"

would be mapped to:

"port 80 and ether[12:4]>300"

The processing technique described herein allows a standard BPF compiler to be applied to the enhanced PCAP data and flow metadata (i.e., the flow metadata 600 within the PCAP records 500).

In an embodiment, the BPF engine 270 is configured to use the flow metadata 600 when performing filtering operations against the headers 410-430 in fields 520 of the PCAP records 500. An aspect of the technique is the use of the BPF expressions to perform pre-searching, so other flow metadata (payloads) can include other BPF expressions depending on the BPF queries, e.g., packets to be found. The flow metadata illustratively provides pointers, i.e., "flow metadata offsets", within each record 500 to enable searching to match the BPF expressions of the BPF queries. That is, a BPF query may be applied to each PCAP record 500 starting at the beginning of the record and extending through the field 520. If a match is not found, the BPF engine 270 continues processing other PCAP records of other captured packets. In response to a match, the BPF engine 270 may cooperate with a process 370 to retrieve a calculated hash value relating to the flow from the BPF record file 340 and may scan the index file 350 to find entries 360 that match the hash value. For each entry that matches the hash value, a path and offset that reference a location of the packet 400 in the PCAP file 320 may be used to access (retrieve) the packet 400. According to the indexing arrangement, this results in multiple, e.g., two, levels of indirection (i) from the BPF record file 340 to the index file 350 and (ii) from the index file 350 to the PCAP file 320. Notably, the multiple levels of indirection enable concurrent searching, retrieval and copying of PCAP records 500, index file entries 360 and packets 400 (stored in their respective files) to accommodate the sustained packet transfer rate, e.g., approximately 20 Gb/sec, of the network link.

Illustratively, upon finding all PCAP records 500 (i.e., in extended PCAP format) that match the BPF expression (and enhanced BPF query), the hash values of the flows (which were previously generated) corresponding to the matching flow records are extracted and used to search entries 360 of the index file 350. For every entry 360 of the index file 350 that matches a hash value, the path 364 to a PCAP file 320 and an offset 366 into the file are used to access the corresponding (matching) packet 400. As noted, the path 364 illustratively includes a stream number (i.e., a directory) and a time stamp (e.g., in nanoseconds). In an embodiment, the process 370 uses the paths 364 and offsets 366 (i.e., indexes) of matching entries to precisely access (i.e., retrieve) matching packets 400 from the appropriate PCAP (packet) file(s) 320 and passes the matching packets to BPF engine 270. All matching packets 400 are then collected (e.g., in time stamp order) and processed to ensure matching of the BPF expression. Note that hash collisions may yield packets not matching the BPF expression. In an embodiment, for each match on a hash value, a full verification is performed (on the actual headers of the packets) to ensure that the IP addresses, ports and protocol type match the BPF expression. If so, the packet 400 may be marked "matched". In addition, when storing packets in the PCAP file 320, the order of the packets is not changed. That is, the packets 400 may be ordered in time of capture (using the time stamp). Notably, the packets are not rearranged in sequential order because of the substantial time consumed to perform sequential ordering.

An alternative approach to the processing technique 300 described herein may be to use a conventional relational database and interface, such as Oracle or MySQL. However, such an interface may not be fast enough to maintain the high insertion rates (e.g., 8-30 M records/second) needed to accommodate the sustained bandwidth (e.g., approximately 20 Gb/sec) of a full duplex, 10 Gb network link. Yet another alternative approach may be to use a different query language/ interface (e.g., JavaScript Object Notation, JSON) that is simple to use and understand. The results of searches of fields populated with values by the query language/interface may then translate (pivot) to the indexing arrangement described herein based on the hash values of flows. That is, an alternative query engine interface may be configured to cooperate with the indexing arrangement of the processing technique 300 to provide the alternative approach.

While there have been shown and described illustrative embodiments of a processing technique configured to provide an improved indexing arrangement that enables efficient storage, filtering and querying of metadata used to retrieve packets intercepted (captured) from a network and persistently stored in a data repository, it is to be understood that various other adaptations and modifications may be made within the spirit and scope of the embodiments herein. For example, embodiments have been shown and described herein with relation to a user issuing a BPF query to the PCR node 200. However, the embodiments in their broader sense are not so limited, and may, in fact, also allow for use of the processing technique 300 for infection tracing and remediation, wherein a (human) network analyst may request network packets for analysis in response to an incident that translates to an exploit. For example, a malware detection appliance coupled to network 130 may issue an alert to the PCR node 200, which may invoke the processing technique 300 to rapidly retrieve all requested packets. As noted, the multi-stage indexing arrangement of the processing technique 300 facilitates capture of packets (and writing to disk) while simultaneously serving queries (retrieving from disk). The malware detection appliance may issue an alert in terms of a BPF expression or query and the PCR node may retrieve all matching packets and return them to the detection appliance, which may perform an analysis on the packet traffic.

Advantageously, the processing technique described herein provides, among other things, a storage format and an improvement to a known filtering mechanism which extends a common query language for network flow and network packets. That is, the technique defines a storage format for network flow records and improves upon the BPF mechanism for processing recorded records. In addition, the extended BPF and PCAP capabilities provide for improved filtering of packets on a computer communications network, and further provide for querying large data sets of archived packets and metadata associated with computer communications. Moreover, the indexing arrangement of the technique enables persistent storage of captured packet traffic at substantially high transfer rates, e.g., approximately 10 Gb/sec full duplex sustained (approximately 20 Gb/sec), while enabling concurrent filtering and retrieval of previously stored packet traffic "on-the-fly" to reduce search and retrieval time from hours to seconds.

Furthermore, queries using the BPF flow metadata may be used to generate reports, such as, e.g., a number of TCP connections generated by a user over a period of time. The information may be accessed using the flow metadata payload by, e.g., walking down every PCAP record 500, running an accumulator and providing the requested results. Queries of the flow metadata may also be used for network traffic recording and retrospective analysis, e.g., in response to one or more requests to retrieve packets associated with a session. The results of the queries may be used to quickly (i) scan and locate all packets associated with a connection and (ii) fetch the packets from the precise locations in the PCAP file. Here, the indexing arrangement enables rapid search and retrieval of packets based on the BPF queries. Notably, the technique extends processing of BPF flow metadata 600 appended to the PCAP record 500 by configuring the BPF engine 270 to examine the flow metadata offsets within each record as if it were processing a network packet.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
intercepting a first packet from a network link at a node coupled to the network link, the node including persistent storage devices organized as a plurality of volumes having a hierarchical file system;
computing a first hash value based on a network flow of the first packet;
recording the first packet in a packet capture (PCAP) format as a first PCAP record including the first hash value and first flow metadata appended to the first PCAP record;
copying the first PCAP record to a first metadata repository stored as a first file on a first volume of the hierarchical file system of the node, wherein the first metadata repository stores a plurality of second PCAP records having second hash values and second flow metadata; and concurrently searching and retrieving one or more of the second PCAP records of the first metadata repository while copying the first packet to a data repository stored as a second file of a second volume of the hierarchical file system of the node to realize a substantially high sustained packet transfer rate of the network link.

2. The method of claim 1 further comprising:

obtaining a first offset of the first packet in the data repository and a first path to the data repository, wherein the data repository stores a plurality of second packets;

copying the first hash value along with the first path and first offset as a first entry into a second metadata repository, wherein the second metadata repository stores a plurality of second entries having second hash values along with second paths and second offsets; and providing an indexing arrangement having multiple levels of indirection that enables concurrent searching, retrieval and copying of the first and second PCAP records, first and second entries, and first and second packets to accommodate the substantially high sustained packet transfer rate of the network link.

3. The method of claim 1 wherein concurrently searching and retrieving comprises:

issuing an expression as a query to the node;

searching the second flow metadata of the second PCAP records stored in the first metadata repository to match the expression;

in response to a match, using a second hash value retrieved from a matching second PCAP record to scan a second metadata repository to find a second entry matching the second hash value; and in response to finding a matching second entry, retrieving a second packet from the data repository.

4. The method of claim 1 wherein the data repository is embodied as secondary storage and wherein recording the first packet comprises:

capturing the first packet and subsequent packets at the substantially high sustained packet transfer rate of the network link for a duration that yields an amount of captured packets that exceeds a memory capacity of the node such that at least a portion of the captured packets is written through to secondary storage without dropping the captured packets and while maintaining capture of the packets at the substantially high sustained packet transfer rate.

5. The method of claim 3 wherein the expression is an extended Berkeley Packet Filter (BPF) expression and wherein searching the second flow metadata comprises extending BPF syntax to include abbreviations for the second flow metadata of the second PCAP records.

6. The method of claim 5 wherein extending the BPF syntax comprises performing a mapping to replace keywords in the extended BPF expression with a standard BPF compatible statement.

7. The method of claim 1 wherein the substantially high sustained packet transfer rate is equal to or greater than 10 Gb/sec.

8. A system comprising:

one or more processors of a node coupled to a network link, the node including persistent storage devices organized as a plurality of volumes having a hierarchical file system;

a plurality of storage repositories organized as an indexing arrangement and coupled to the one or more processors, the storage repositories including (i) a data repository configured to store packets intercepted from the network link, (ii) a first metadata repository configured to store flow records having hash values and flow metadata, and (iii) a second metadata repository configured to store entries having the hash values along with paths and offsets to the packets stored in the data repository; and a memory coupled to the one or more processors and configured to store one or more processes of an operating system, the one or more processes executable by the one or more processors to utilize the indexing arrangement to concurrently search and retrieve one or more of the flow records from the first metadata repository stored as a first file of a first volume of the hierarchical file system while copying one or more of the packets to the data repository for storage on a second file of a second volume of the hierarchical file system to realize a substantially high sustained packet transfer rate of the network link.

9. The system of claim 8 wherein the one or more processes comprises a Berkeley Packet Filter (BPF) engine that processes a BPF expression used as a precursor to the indexing arrangement to enable access to the repositories when searching and locating the stored packets matching the expression.

10. The system of claim 9 wherein the BPF engine performs filtering operations to match the BPF expression against headers of the flow records using the flow metadata of the flow records.

11. The system of claim 10 wherein, in response to a match, the BPF engine cooperates with a first process of the one or more processes to retrieve a hash value from a matching flow record and scan the second metadata repository to find one or more entries that match the hash value.

12. The system of claim 11 wherein, for entries that match the hash value, the first process uses the paths and offsets that reference locations in the data repository to retrieve and pass matching packets to the BPF engine.

13. The system of claim 12 wherein the BPF engine collects the matching packets in a time stamp order and process the matching packets to ensure matching of the BPF expression.

14. The system of claim 13 wherein the BPF engine processes the matching packets to perform a full verification on the headers.

15. The system of claim 8 wherein the one or more processes comprises a decoder of a packet capture engine the decodes and hashes a network flow of each packet intercepted from the network link.

16. The system of claim 15 wherein the network flow comprises source and destination Internet Protocol (IP) addresses, source and destination port numbers and protocol type.

17. The system of claim 15 wherein the decoder hashes the network flow using a hash function to calculate a hash value for each packet.

18. The system of claim 17 wherein the hash function is a CRC-32C function.

19. The system of claim 8 wherein the substantially high sustained packet transfer rate is approximately 10 Gb/sec full duplex.

20. A non-transitory computer readable medium including program instructions for execution on one or more processors, the program instructions when executed operable to:

intercept a first packet from a network link at a node coupled to the network link, the node including persistent storage devices organized as volumes having a hierarchical file system;

compute a first hash value based on a network flow of the first packet;

record the first packet in a packet capture (PCAP) format as a first PCAP record including the first hash value and first flow metadata appended to the first PCAP record;

copy the first PCAP record to a first metadata repository stored as a first file of a first volume of the hierarchical file system of the node, wherein the first metadata repository stores a plurality of second PCAP records having second hash values and second flow metadata; and concurrently search and retrieve one or more of the second PCAP records of the first metadata repository while copying the first packet to a data repository for storage on a second file of a second volume of the hierarchical file system of the node to realize a substantially high sustained packet transfer rate of 10 Gb/sec full duplex of the network link.

* * * * *